Patented May 4, 1937

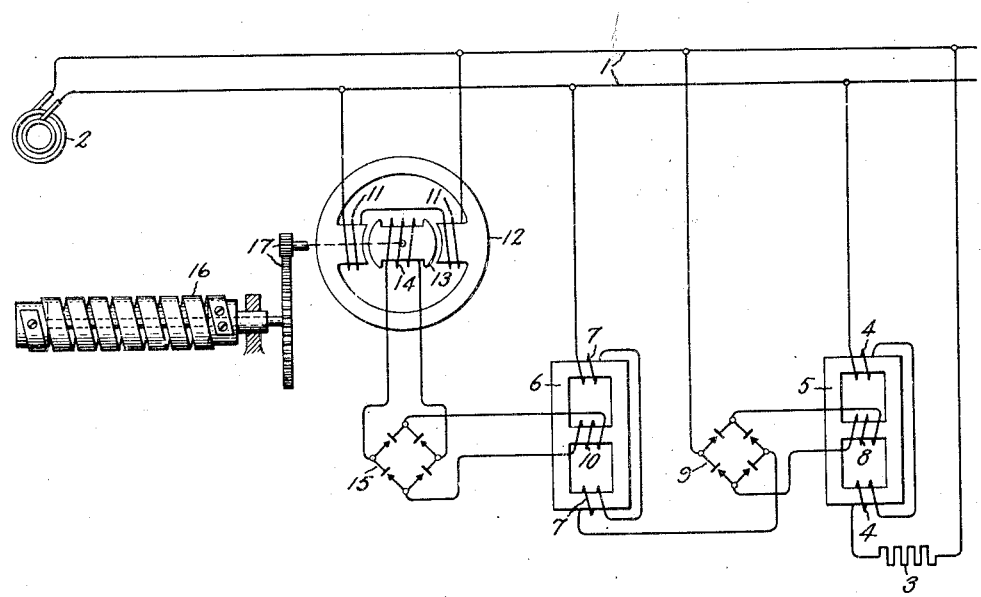

2,079,466

UNITED STATES PATENT OFFICE 2,079,466

ELECTRICAL CONTROL SYSTEM

Henry Eckford Phillips, Schenectady, N. Y., assignor to General Electric Company, a corporation of New York Application July 20, 1934, Serial No. 736,163

2 Claims. (Cl. 219—20)

My invention relates to electrical control systems and more particularly to improvements in automatic electrical regulating systems.

In most electrical control and automatic regulating systems a relatively sensitive, delicate and small power capacity device is used to control a relatively rugged and large power capacity translating device, usually through suitable amplifying means.

In accordance with my invention I provide a novel control system in which a variable ratio transformer is used to control the energization of a control or saturating winding for a magnetic amplifier or saturable core reactor. When the variable ratio transformer is a variable inductive coupling transformer, such for example, as a miniature induction voltage regulator, my system provides smooth continuous control and requires no contacts which are liable to stick or burn.

Although my invention is in no sense limited thereto, the particular application thereof which I at present contemplate making, is to temperature or heat regulators in which a thermally responsive device controls a miniature induction voltage regulator and a saturable core reactor controls the energization of a heater, such for example, as a resistance heater.

An object of my invention is to provide a new and improved electrical control system.

Another object of my invention is to provide a new and improved automatic electrical regulating system.

My invention will be better understood from the following description taken in connection with the accompanying drawing and its scope will be pointed out in the appended claims.

Referring now to the single figure of the accompanying drawing, in which I have shown diagrammatically an embodiment of my invention adapted for use as an automatic temperature regulator, an alternating current supply circuit 1, which is energized from any suitable source, such as a generator 2, has connected thereto a power translating device, such as a heater in the form of a resistance heater 3. Connected in series with the heater 3 for controlling the current therethrough is the alternating current winding 4 of a saturable core reactor 5. For increasing the amplification or range of control of my system, I have shown a second saturable core reactor 6 concatenated or cascaded with reactor 5. Reactor 6 is provided with an alternating current winding 7, while reactor 5 is provided with a direct current control winding 8 and these windings are connected in series across the power supply circuit 1 through a rectifier 9, such as a bridge-connected copper oxide rectifier. The connection is such that the alternating current passing through the winding 7 on reactor 6 is rectified by rectifier 9 into direct current for the control winding 8. Reactor 6 is also provided with a direct current control winding 10.

For controlling the current in control winding 10 I provide a variable ratio transformer preferably in the form of a variable inductive coupling transformer of the miniature inductive voltage regulator type. Such a device consists of a primary winding 11, connected across the supply circuit 1, a core 12 which is magnetized by the winding 11, and a relatively rotatable member 13 carrying a secondary winding 14. By rotating the member 13 a quarter of a turn the full range of control of the regulator may be covered. Thus, in the illustrated position of member 13 the windings 11 and 14 are axially alined and the magnetic coupling is a maximum and the voltage induced in the secondary winding 14 is a maximum, whereas if the device 13 is rotated a quarter of a turn the windings are axially at right angles and the inductive coupling between them is a minimum, or substantially zero. In intermediate positions intermediate voltages will be generated in the winding 14. Interconnecting the winding 14 and the control winding 10 of reactor 6 is a rectifier 15 similar to rectifier 9.

For operating the regulator I may employ any suitable means such as a bimetallic helix 16 which serves as a thermally responsive element. In order to secure the desired range and sensitivity of operation the bimetallic device 16 drives the miniature voltage regulator through suitable gearing 17. With such an arrangement, and assuming a gear ratio of 10:1, it will be seen that a rotation, of the end of the helix connected to the gears, of but nine degrees, in response to a differential expansion or contraction of the helix, will result in a quarter turn or ninety degree rotation of the rotor of the voltage regulator.

The operation of the illustrated embodiment of my invention is as follows: Assume that circuit 1 has just been energized after a period of deenergization long enough to allow the heater 3 to cool. With the parts in the positions shown in the drawing the thermostat 16 is in its minimum temperature position and the control system is calling for the maximum amount of heat. Thus, the windings 11 and 14 are alined thereby producing a maximum voltage and a maximum energization of the control winding 10 of reactor 6, thereby producing a maximum saturation of this reactor, whereby its reactance or choking effect is a minimum, thereby producing a maximum amount of direct current in the control winding 8 of reactor 5, whereby the saturation or reactance of the alternating current winding 4 of reactor 5 is a minimum, thereby permitting a maximum amount of current to flow through the heater 3. As the temperature of the heater increases and the amount of heat produced thereby increases, the thermostatic strip 16 is affected and the differential expansion caused by the increase in temperature will cause rotation of the gears 17, thereby turning the element 13 and reducing the inductive coupling between the windings 11 and 14. This reduces the current through the control winding 10 of reactor 6 thereby increasing the choking effect or reactance of the alternating current winding 7 of reactor 6, whereby the choking effect of reactor 5 is also increased, thereby decreasing the current in the heater 3 and reducing the heat produced thereby. The thermal element 16 can be designed so that it requires but a relatively small temperature change, such for example as one or two degrees, to cause sufficient differential expansion or contraction to rotate the rotatable element 13 of the regulator through a quarter turn. Consequently, the entire range of control between maximum and minimum current in the heater 3 may be made responsive to a very small temperature change.

If conditions require more heat thermostat 16 will respond in the opposite direction thereby increasing the saturation of the reactors 6 and 5 and increasing the heat effect of the heater 3.

By using the two reactors 5 and 6, a greater range of control may be secured and reactor 5 may be a higher rating reactor than reactor 6, as the latter merely controls the control winding of the former.

It should of course be understood that my invention is not limited to the particular thermal controller shown, and as a bimetallic element of the type illustrated cannot be used for very high temperatures, it will be obvious to those skilled in the art that equivalent high temperature responsive thermal means, such for example as a pyrometer bulb, may be substituted for the bimetallic helix if the system is used to respond to very high temperatures.

While I have shown and described a particular embodiment of my invention, it should be obvious to those skilled in the art that changes and modifications may be made without departing from my invention, and I therefore aim in the appended claims to cover all such changes and modifications as fall within the true spirit and scope of my invention.

What I claim as new and desire to secure by Letters Patent of the United States, is:

1. In an automatic regulating system, in combination, an alternating current supply circuit, an electrical heater connected to be energized from said circuit, a saturable core reactor having a direct current control winding and having an alternating current winding in circuit with said heater, means including a rectifier for energizing said direct current control winding from said circuit, a variable inductive coupling transformer for controlling the current in said direct current winding, and means responsive to temperature produced by said heater for varying the inductive coupling of said transformer by rotating its windings relatively to each other.

2. In an automatic regulating system, an alternating current supply circuit, a resistance heater connected to be energized therefrom, a saturable core reactor having an alternating current winding in circuit with said heater and having a direct current control winding, a rectifier, a second saturable core reactor having an alternating current winding and a direct current control winding, a circuit energized from said supply circuit and including the direct current winding of the first reactor, said rectifier and the alternating current winding of the second reactor, a miniature induction voltage regulator having a primary winding connected to said supply circuit and having a secondary winding connected to the direct current control winding of the second reactor, a rectifier interposed between said secondary winding and the control winding of the second reactor, a bimetallic thermal element responsive to the temperature produced by said heater, and a mechanical operating connection between said element and said regulator.

HENRY ECKFORD PHILLIPS.